United States Patent [19]

Sundhar

[11] Patent Number: 4,888,678

[45] Date of Patent: Dec. 19, 1989

[54] ELECTRIC SOCKET ADAPTER

[76] Inventor: Shaam P. Sundhar, 87 Juniper Ave., Westerville, Ohio 43081

[21] Appl. No.: 251,440

[22] Filed: Sep. 30, 1988

[51] Int. Cl.[4] .................... H02M 1/00

[52] U.S. Cl. .................... 363/146; 363/141; 315/71

[58] Field of Search .................... 363/141, 144, 146, 147; 315/71, 72, 200 R, 205

[56] References Cited

U.S. PATENT DOCUMENTS 3,028,523 4/1962 Seid .................... 315/71
3,331,013 7/1967 Cunningham .................... 363/146
3,372,302 3/1968 Fasola .................... 315/71
3,818,263 6/1974 Belko .................... 315/71
3,836,814 9/1974 Rodriquez .................... 315/71

*Primary Examiner*—Peter S. Wong
*Attorney, Agent, or Firm*—Biebel, French & Nauman

[57] ABSTRACT

A socket adaptor is provided for use with light bulbs in either 110 V or 220 V circuits. The device includes a housing having first and second ends for placement into a light bulb socket and retaining of a light bulb respectively. The interior of the housing may include a circuit board with a rectifier fastened thereto. The circuit board may also have a thermistor and a bridge rectifier fastened thereto.

20 Claims, 5 Drawing Sheets

ELECTRIC SOCKET ADAPTER

BACKGROUND OF THE INVENTION

This invention relates to an energy saving device and more particularly to one which reduces power consumption by electric light bulbs or lamps, thereby prolonging their life. The use of direct current as well as reduced RMS voltage to extend the life of an incandescent light bulb is well known. In many such devices, a half-wave rectifier is secured to the base of a light bulb prior to the bulb's insertion into a conventional socket. By reducing the effective voltage applied to the bulb filament by imposing a lower effective voltage thereupon, the operating life of the bulb is substantially extended, in some cases enabling a bulb to operate for a period of time many times greater than its ordinary expected life. An example of this type of device is shown in Niskin, U.S. Pat. No. 4,350,931.

Regardless of the type of bulb for which electric bulb savers have been designed, a number of shortcomings have presented themselves. First, the brightness of the lamp is drastically diminished. Second, many of the devices have become dislodged from the bulb base and upon removal of the bulb from the socket for insertion of a replacement bulb therein, the device may become stuck in the socket so as to preclude its successful orientation with respect to the replacement bulb and the electrical connections of the socket. This problem is acerbated when a large or weighty lamp is involved and the socket is upwardly facing. An additional problem arises when dealing with 220 V bulbs, since they are designed to be pressed into their socket and then rotated approximately 150. The combination of pressure and subsequent twisting tends to permit relative movement between the rectifier unit and its electrical contact, which may result in the bulb not working properly.

Therefore it is apparent that the need exists for a simple, yet dependable electric bulb saver which may include any combination of a rectifier, thermistor and SCR bilateral switch that ensures that the aforesaid components make solid contact with the bulb.

SUMMARY OF THE INVENTION

In accordance with this invention, a socket adapter having any combination of a rectifier, bilateral SCR or thermistor housing therein is provided for advantageous use with incandescent light bulbs. The socket adapter includes a housing having a first end which is capable of being placed into a bulb socket designed for use with a light bulb, and a second end capable of retaining a light bulb therein. The housing serves to connect as well as separate the first end portion from the second end portion. Means are provided for retaining the first end portion in an electrical socket, as well as means for retaining an electric light bulb in the improved socket adapter.

Bulb contacts extend from the first end portion of the housing into the second end portion of the housing in the preferred embodiment. In that first end portion of the housing, a rectifier is securely positioned between the socket contacts and the bulb contacts. The rectifier may be securely attached as well to a circuit board. Modified embodiments include the positioning of a thermistor, as well as a bridge rectifier, in the electrical circuit of the socket adapter.

Additionally, the housing can be fabricated for use with light bulbs of the bayonet type. In this embodiment of the invention, the electrical contacts are attached to a circuit board having at least a rectifier positioned thereon, with circuit connecting means secured to the electrical contacts adjacent the electrical outlet, as well as to the bulb engaging rods which extend into the second end of the housing for contacting an electric light bulb. Additional components, including a thermistor and a bridge rectifier, may be used in modifications of the basic invention. The primary objective of this invention is to provide an electric socket adapter that significantly prolongs the life of light bulbs used with either 200 V or 110 V circuits.

Another objective is the providing of an improved socket adapter for use as an electric bulb saver which can be easily secured in a socket as well as secured to an electric light bulb.

These and other objects and advantages of this invention will be apparent from the following description, the accompanying drawings and the appended claims.

DETAILED DESCRIPTION OF THE INVENTION

Figure 1:
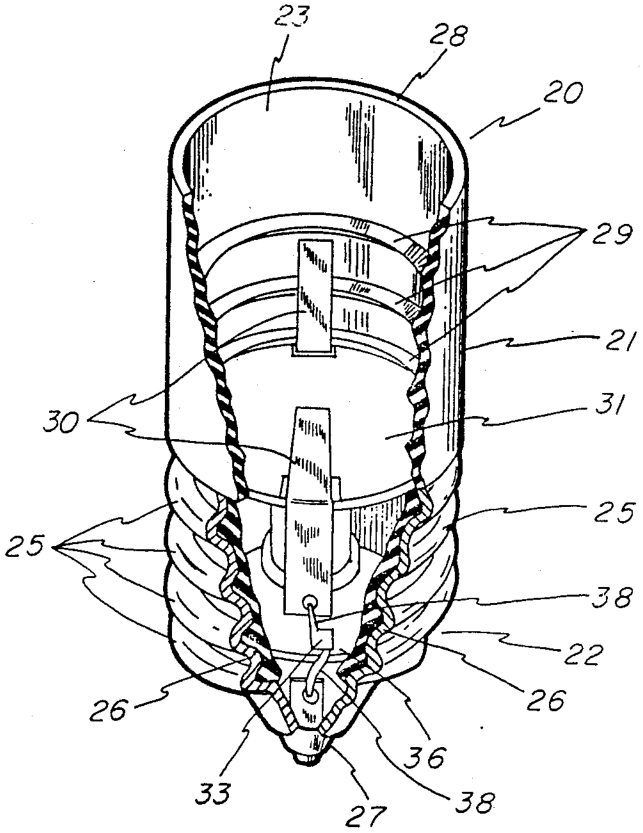
FIG. 1 is an exploded view of the electric socket adapter showing the preferred embodiment of the device for use in 110 V circuits.

Having reference to the drawings, attention is directed first to FIG. 1 which illustrates a socket adapter embodying this invention and designated generally by the numeral 20. This socket adapter has a housing 21 similar to the conventional housings found in socket adapters for use in 110 V circuits. As can be seen, the housing includes a first end 22 and second end 23. The first end 22 is capable of placement into a bulb socket designed for use with a light bulb by means of outer threaded portion 25. Outer threaded portion 25 makes electrical contact with the circuit by means of a metal sheath 26 secured to the outer surface thereof. Another socket contact is facilitated by metal tip 27.

The second end portion 23 includes an annular side wall 28 having an inner threaded portion 29 such that the second end portion is capable of retaining a light bulb therein. A pair of metal strips serve as bulb contacts, with one of the bulb contacts extending adjacent the side wall 28 while the second bulb contact extends relatively perpendicularly thereto.

Figure 2:
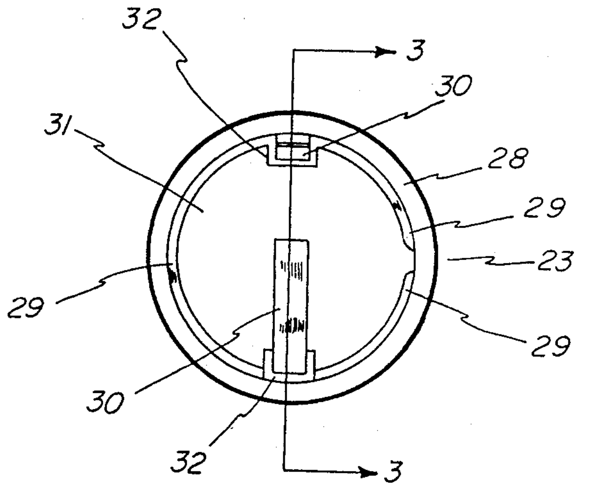
FIG. 2 is a top view of FIG. 1.
Figure 3:
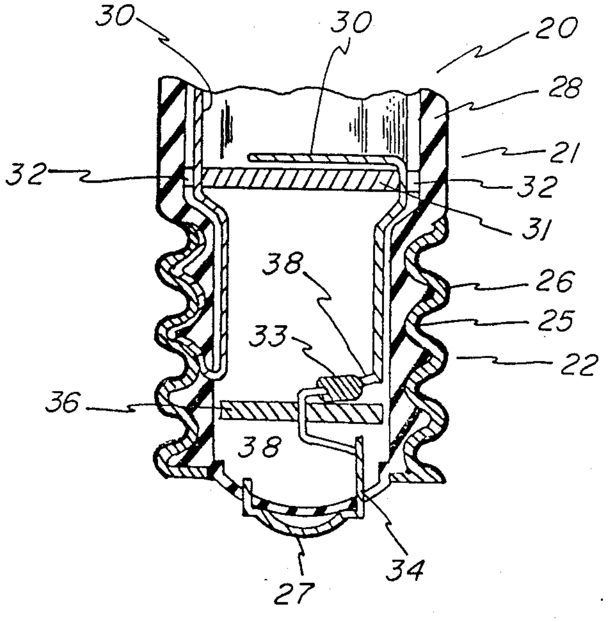
FIG. 3 is a vertical cross sectional view on an enlarged scale taken along line 3.3 of FIG. 2 showing primarily the lower most portion of the device.
Figure 4:
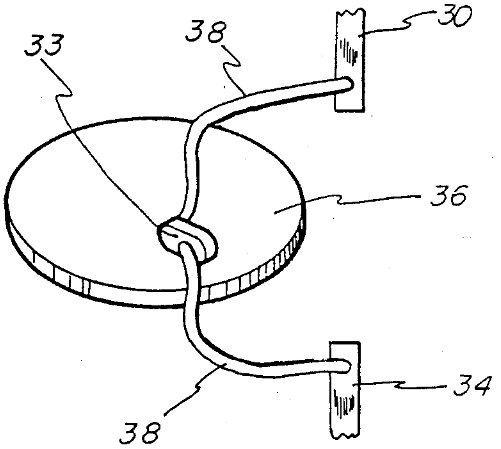
FIG. 4 is a perspective view on an enlarged scale of the circuit board shown in FIG. 1.

In the embodiment of the invention shown in FIGS. 1-3, the bulb contacts extend from the second end of the housing into the first end portion of the housing. As in conventional 110 V sockets, one of the bulb contacts passes through an aperture in the outer threaded portion 25 and is secured between it and metal sheath 26. However, whereas the other bulb contact extends through socket bottom 31 by means of bottom apertures 32 so as to terminate in metal tip 27, this invention includes the positioning of a rectifier in the first end portion of the housing.

As can be seen in FIGS. 2-6, a rectifier 33 is positioned between bulb contact 30 and tip extension 34 with electrical contact being made with those elements by circuit connecting means 38 which may be wire or electrical fastening means such as solder. The presence of the rectifier reduces the effective voltage applied to the bulb filament. The rectifier used in this invention preferably is a sidac with a $V_{bo}$ of 100 V. The rectifier is shown on a circuit board 36. The circuit board is approximately ⅛" thick and is fabricated from a suitable material such as plastic or wood. Depending upon the structural integrity of the components of the socket adapter, it may be possible in socket adapters for use with 110 V circuits to omit the circuit board if the rectifier is securely maintained in electrical contact with the bulb contact and tip extension. If a circuit board is used, it may be advantageous to secure it to a portion of the inner wall of outer threaded portion 25.

Figure 5:
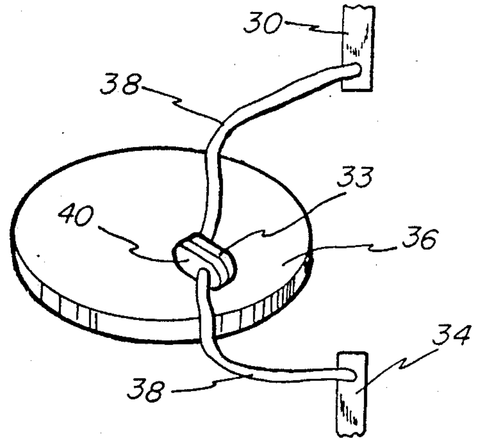
FIG. 5 discloses a circuit board used in a modified embodiment of the invention for use in 110 V circuits.

FIG. 5 shows a thermistor 40 being connected in series with rectifier 33, with this thermistor being of the negative temperature coefficient type. The thermistor has an R value at 250° C. of between 10 and 100 ohms, while its R at 75° C. is considerably less. The thermistor has a preferred power dissipation of under two watts, a soft glow time from zero to maximum brightness of 1-3 seconds. The presence of a thermistor will help to extend a bulb's life and is particularly desirable if the light bulb with which the socket adapter is used is turned on-and-off somewhat frequently. The use of an embodiment with a thermistor will not impact on brightness, but only on the stress the bulb encounters when the initial rush of current occurs. If the filament is weak, the normal switching on of the bulb may cause the filament to break.

Figure 6:
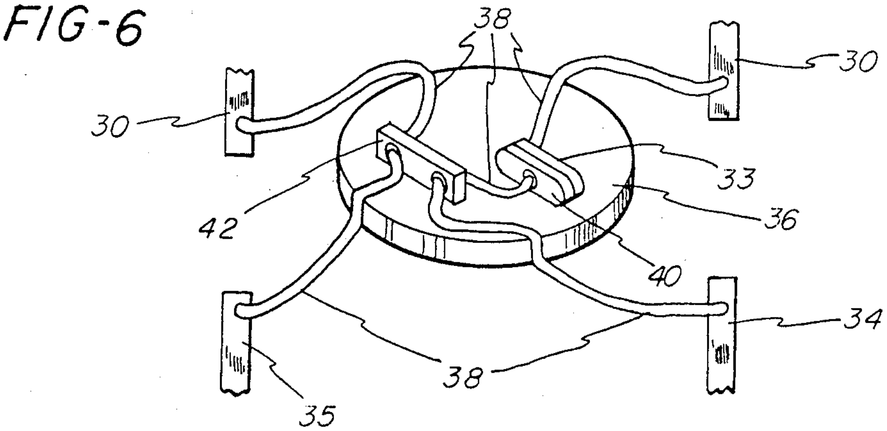
FIG. 6 shows a circuit board for use in a further embodiment of the invention for use in 110 V circuits.

Yet another embodiment is shown in FIG. 6, wherein in addition to a thermistor, a bridge rectifier 42 is included in the circuit of this invention. Preferably the bridge rectifier has a PIV of 300 V or more, an $I_f$ of 1.5 amperes or more and a $V_f$ of approximately one volt.

Figure 7:
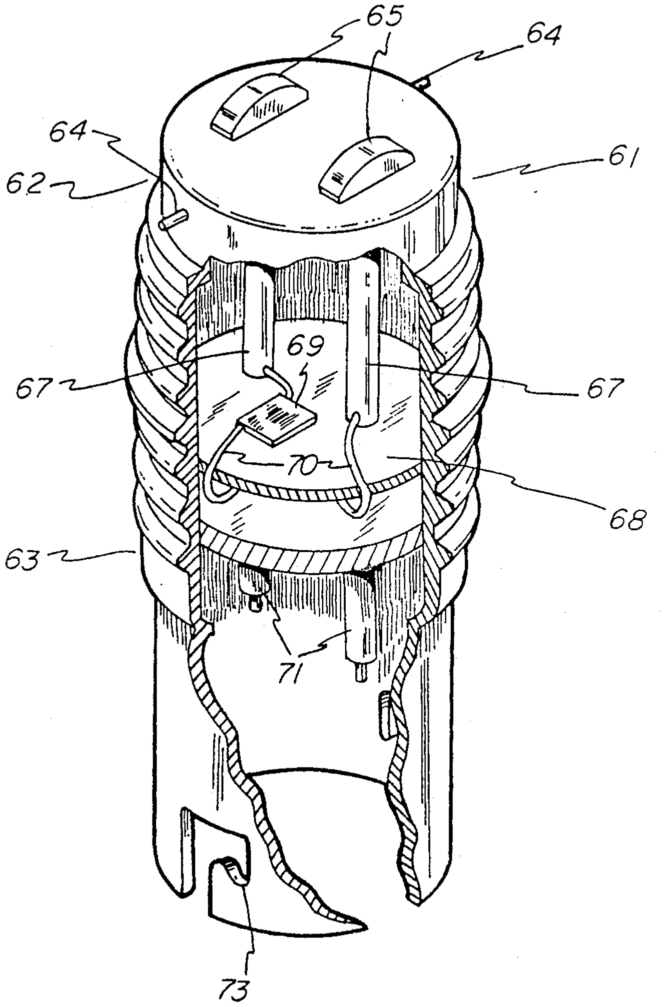
FIG. 7 is an exploded view of the invention showing the preferred embodiment of the device for use in 220 V circuits.
Figure 8:
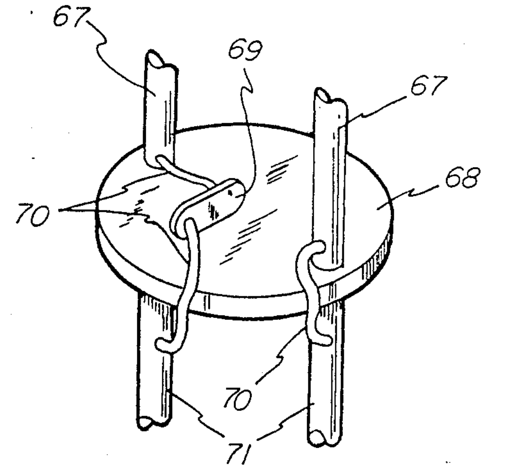
FIG. 8 is a perspective view on an enlarged scale of the circuit board disclosed in FIG. 7.

FIG. 7 discloses an improved socket adapter in the preferred embodiment for use of this invention for use with light bulbs of the bayonet type. The socket adapter for use with light bulbs of the bayonet type has a housing 61 with first end 62 and second end 63. First end 62 is capable of placement into a bulb socket for use with a light bulb of the bayonet type, since it features bayonets 64 as well as electrical contacts 65. Extending from these electrical contacts into the interior of the housing 61 are rods 67, the ends opposite electrical contacts 65 being secured to circuit board 68. A rectifier 69 is positioned adjacent circuit board 68 and is secured to one of the rods 67 by circuit connecting means 70. Additionally, the sidac used in this type of embodiment should have a $V_{bo}$ of around 200 V.

Spring biased bulb engaging rods 71 extend away from circuit board 68 and project into the second end portion 63 of the housing. On their way, the bulb engaging rods 71 also pass through a planar portion 72 of housing 61 which serves to separate the first end portion from the second end portion. Circuit connecting means 70 extend from one side of the circuit board to the other, where contact is made with the bulb engaging rod 71. To facilitate this contact, the diameter of the circuit board 68 is less than the inner diameter of housing 61 at the location where the circuit board is maintained. A pair of L-shaped slots 33 serve to retain the bayonets of a light bulb in the second end portion 63 while the bulb engaging rods 71 make electrical contact with the light bulb itself.

Figure 9:
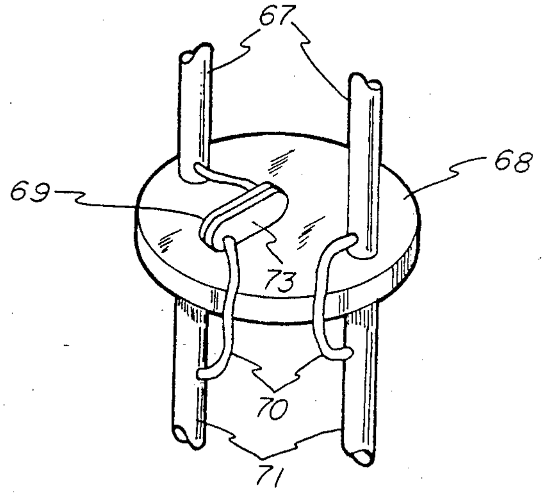
FIG. 9 is a perspective view on an enlarged scale of a circuit board for use in a modification of the invention for use with a light bulb of the bayonet type.
Figure 10:
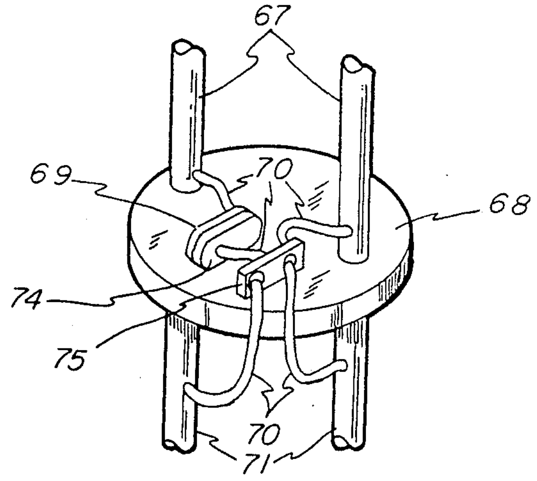
FIG. 10 is a perspective view on an enlarged scale of a further modification of the invention for use with a light bulb of the bayonet type.

FIGS. 9 and 10 show modifications of the embodiment for use with light bulbs of the bayonet type. FIG. 9 discloses a thermistor 74 which may be identical to thermistor 40, with thermistor 74 being in series with rectifier 69. FIG. 10 discloses a modified embodiment which also includes a bridge rectifier 75. In the embodiment for use with light bulbs of the bayonet type, although the thermistor may be the same as the one used in 110 V circuits, the bridge rectifier would have a PIV of 400 V or more, an $I_f$ of at least one amp and a $V_f$ of approximately one volt.

Figure 11:
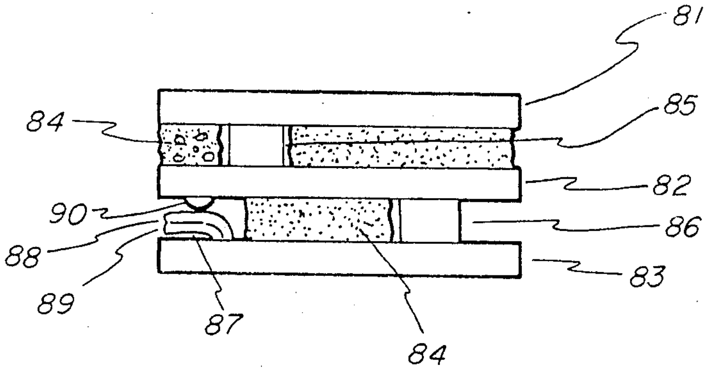
FIG. 11 is a side plan view of another modified embodiment.
Figure 12:
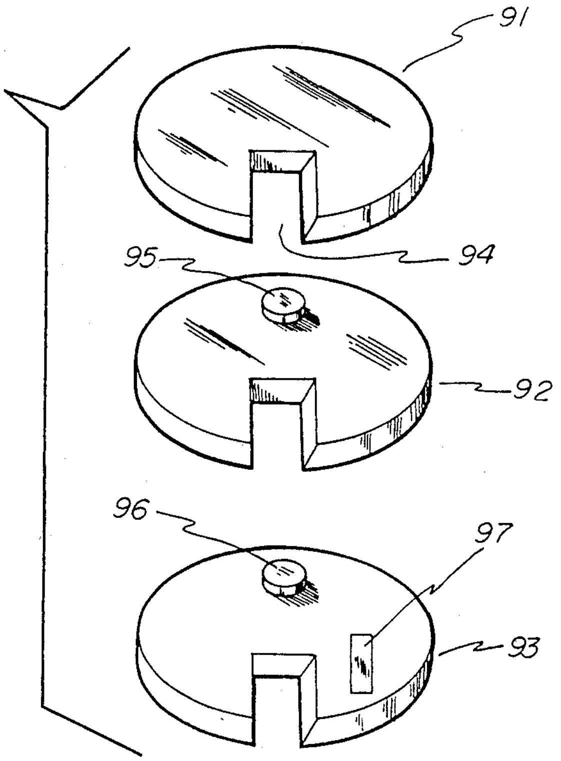
FIG. 12 is a perspective view of another modified embodiment for use with a light bulb of the bayonet type.

FIGS. 11 and 12 show yet another modified embodiment of the invention. The embodiment shown in FIG. 11 discloses the utilization of three metal plates 81, 82 and 83 which are separated from each other by insulating material 84. Positioned between first and second plates 81 and 82, respectively is a rectifier or SCR bilateral switch 85 which is in electrical connection with the plates. Thermistor 86 is positioned in electrical connection between the second and third plates, 82 and 83, respectively.

A bimetal strip 87 having one metal forming its upper surface 88 and another metal forming its lower surface 89 is shown as being located on third plate 83. On opposing second plate 82 is a contact point 90, which strip 87 contacts as strip 87 bends in response to the passage of current through it. Once contact is established, the current no longer flows through the thermistor 86, thus eliminating the power dissipation associated therewith as well as the generated heat which over time can adversely effect the socket where the invention is maintained. When the current ceases to flow, strip 87, as it cools, returns to its initial configuration. This embodiment could be used with conventional 110 V circuits.

FIG. 12 discloses a modified embodiment similar to the one just discussed, but for use with light bulbs of the bayonet type. As can be seen, there are three plates 91, 92 and 93, each of which has a cut out portion 94 to facilitate the AC connector associated with the bulb. On the second plate is rectifier or SCR bilateral switch 95, while on the third plate 93 is thermistor 96. Bimetal strip 97 is formed and acts just as strip 87 does in the embodiment shown in FIG. 11. When assembled, the plates of FIG. 12 should also have insulation therebetween. The structure of FIG. 12 behaves just as the one in FIG. 11. These modified embodiments may be substituted for the circuit board embodiments shown in FIG. 5 and 9 if desired.

Use of a sidac in either the 110 V or 220 V embodiments results in an insignificant loss of light, since energy in both parts of a cycle is used.

in actual operation, the improved socket adapter of this invention may be positioned in a normal electrical socket, at which time the appropriate type of light bulb can be inserted therein and secured.

It will be readily apparent from the foregoing detailed description of the preferred embodiment and the several modifications thereof that a particularly novel and extremely effective socket adapter is provided. The device is relatively simple to fabricate, since it resembles socket adapters currently on the market, however, it results in a device which provides a significant increase in extension of bulb life while increasing the dependability of this type of unit over bulb savers previously known.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A socket adaptor for use with light bulbs comprising a first end capable of placement into a bulb socket designed for use with a light bulb, a second end capable of retaining a light bulb therein, a housing connecting said first and second ends, and a rectifier electrically connected to both said first and second ends that reduces the effective voltage that will pass through said socket adaptor from said bulb socket to said light bulb, said rectifier electrically connected directly to a thermistor, said rectifier electrically connected to a bridge rectifier, said bridge rectifier reducing the RMS value associated with said socket adaptor.

2. A socket adaptor as claimed in claim 1, wherein said rectifier is a sidac.

3. A socket adaptor as claimed in claim 1, wherein said thermistor is of the negative temperature coefficient type.

4. A socket adaptor as claimed in claim 3, wherein said first end is capable of placement into a bulb socket designed for use with a light bulb of the bayonet type.

5. A socket adaptor as claimed in claim 4, wherein said second end is capable of retaining a light bulb of the bayonet type therein.

6. A socket adaptor as claimed in claim 3, wherein said first end is capable of placement into a bulb socket for use in 110 V circuits.

7. A socket adaptor as claimed in claim 6, wherein said second end is capable of retaining a light bulb of the type used in 110 V circuits.

8. A socket adaptor for use with light bulbs comprising a first end capable of placement into a bulb socket designed for use with a light bulb, a second end capable of retaining a light bulb therein, a housing connecting said first and second ends, and a rectifier electrically connected to both said first and second ends that reduces the effective voltage that will pass through said socket adaptor from said bulb socket to said light bulb, said rectifier electrically connected to a thermistor, said thermistor of the negative temperature coefficient type, said socket adaptor including three metal plates, said rectifier in electrical connection between the first and second plates, said thermistor in electrical connection between the second and third plates, a bimetal strip and contact point fixedly secured on opposing faces of said second and third plates, said bimetal strip deformable when the temperature of the plates to which it is secured is approximately 140° F. so as to short out the thermistor.

9. A socket adaptor as claimed in claim 8, wherein said thermistor is of the negative temperature coefficient type.

10. A socket adaptor as claimed in claim 8, wherein said rectifier is a sidac.

11. A socket adaptor as claimed in claim 8, wherein said first end is capable of placement into a bulb socket designed for use with a light bulb of the bayonet type.

12. A socket adaptor as claimed in claim 11, wherein said second end is capable of retaining a light bulb of the bayonet type therein.

13. A socket adaptor as claimed in claim 8, wherein said first end is capable of placement into a bulb socket for use in 110 V circuits.

14. A socket adaptor as claimed in claim 13, wherein said second end is capable of retaining a light bulb of the type used in 110 V circuits.

15. A socket adaptor for use with light bulbs comprising a first end capable of placement into a bulb socket designed for use with a light bulb, a second end capable of retaining a light bulb therein, a housing connecting said first end and second ends, and a rectifier electrically connected to both said first and second ends that reduces the effective voltage that will pass through said socket adaptor from said bulb socket to said light bulb, said rectifier electrically connected to a thermistor, a bimetal strip and contact point secured in said socket adaptor, said bimetal strip deformable when the temperature of that component of said socket adaptor to which it is secured is approximately 140° F. so as to short out the thermistor.

16. A socket adaptor as claimed in claim 15, wherein said rectifier is a sidac.

17. A socket adaptor as claimed in claim 15, wherein said first end is capable of placement into a bulb socket designed for use with a light bulb of the bayonet type.

18. A socket adaptor as claimed in claim 17, wherein said second end is capable of retaining a light bulb of the bayonet type therein.

19. A socket adaptor as claimed in claim 15, wherein said first end is capable of placement into a bulb socket for use in 110 V circuits.

20. A socket adaptor as claimed in claim 19, wherein said second end is capable of retaining a light bulb of the type used in 110 V circuits.

* * * * *